US012154491B2

(12) United States Patent
Zhai et al.

(10) Patent No.: US 12,154,491 B2
(45) Date of Patent: Nov. 26, 2024

(54) PIXEL CIRCUIT, DISPLAY PANEL AND DISPLAY DEVICE

(71) Applicant: Shanghai Tianma Micro-Electronics Co., Ltd., Shanghai (CN)

(72) Inventors: Yingteng Zhai, Shanghai (CN); Xiaoxiang He, Shanghai (CN)

(73) Assignee: Shanghai Tianma Micro-Electronics Co., Ltd., Shanghai (CN)

(*) Notice: Subject to any disclaimer, the term of this patent is extended or adjusted under 35 U.S.C. 154(b) by 0 days.

(21) Appl. No.: 18/364,048

(22) Filed: Aug. 2, 2023

(65) Prior Publication Data

US 2023/0419885 A1 Dec. 28, 2023

(30) Foreign Application Priority Data

Apr. 25, 2023 (CN) ......................... 202310453124.4

(51) Int. Cl.
*G09G 3/32* (2016.01)
*G09G 3/3233* (2016.01)

(52) U.S. Cl.
CPC ....... *G09G 3/32* (2013.01); *G09G 2300/0842* (2013.01); *G09G 2320/0233* (2013.01); *G09G 2320/0247* (2013.01)

(58) Field of Classification Search
None
See application file for complete search history.

(56) References Cited

U.S. PATENT DOCUMENTS

| | | | | |
|---|---|---|---|---|
| 11,069,292 | B1 * | 7/2021 | Heganovic | G09G 3/3233 |
| 2019/0096327 | A1 * | 3/2019 | Peng | G09G 3/3241 |
| 2021/0082339 | A1 * | 3/2021 | Zhang | G09G 3/2092 |
| 2024/0212593 | A1 * | 6/2024 | Li | G09G 3/3225 |

FOREIGN PATENT DOCUMENTS

| | | | |
|---|---|---|---|
| CN | 105225626 | A | 1/2016 |
| CN | 113571016 | A | 10/2021 |

* cited by examiner

*Primary Examiner* — Krishna P Neupane

(74) *Attorney, Agent, or Firm* — CHRISTENSEN O'CONNOR JOHNSON KINDNESS PLLC

(57) ABSTRACT

A pixel circuit, a display panel and a display device. The pixel circuit includes drive transistor, storage capacitor, compensation circuit, and voltage controller. The drive transistor has a gate electrode connected to a first node and generates a drive current in a light-emitting phase of an operation cycle of the pixel circuit. The storage capacitor has a first plate connected to the first node and a second plate connected to a second node and stores a data voltage inputted to the gate electrode of the drive transistor. The compensation circuit has an output terminal connected to the second node and a first input terminal receiving a first power supply voltage and compensates a deviation of the first power supply voltage affecting the drive current. The voltage controller is connected to the second node and controls a fluctuation of a voltage of the second node prior to the light-emitting phase.

20 Claims, 14 Drawing Sheets

PIXEL CIRCUIT, DISPLAY PANEL AND DISPLAY DEVICE

CROSS-REFERENCE TO RELATED APPLICATIONS

The present application claims priority to Chinese Patent Application No. 202310453124.4, filed on Apr. 25, 2023, the entire contents of which are incorporated herein by reference in its entirety.

TECHNICAL FIELD

The present disclosure relates to the technical field of display, and in particular, to a pixel circuit, a display panel and a display device.

BACKGROUND

A conventional display panel includes a pixel circuit for driving a light-emitting element to emit light. The light-emitting element may be a light-emitting diode (LED), such as a mini-LED and a micro-LED. The light-emitting element may be an organic light-emitting diode (OLED). The pixel circuit includes a drive transistor. When the pixel circuit works, a data voltage is supplied to a gate electrode of the drive transistor, the drive transistor generates a drive current under action of a voltage difference between the gate electrode and a source electrode of the drive transistor, and the drive current drives the light-emitting element to emit light. The display panel driven by the conventional pixel circuit has poor display uniformity, affecting display effect.

SUMMARY

In a first aspect, the present disclosure provides a pixel circuit. The pixel circuit includes:

- a drive transistor including a gate electrode connected to a first node, wherein the drive transistor is configured to generate a drive current in a light-emitting phase of an operation cycle of the pixel circuit;
- a storage capacitor including a first plate connected to the first node and a second plate connected to a second node, wherein the storage capacitor is configured to store a data voltage inputted to the gate electrode of the drive transistor;
- a compensation circuit including an output terminal connected to the second node and a first input terminal for receiving a first power supply voltage, wherein the compensation circuit is configured to compensate a deviation of the first power supply voltage affecting the drive current; and
- a voltage controller connected to the second node and configured to control a fluctuation of a voltage of the second node prior to the light-emitting phase.

In a second aspect, the present disclosure provides a display panel. The display panel includes pixel circuits. At least one of the pixel circuits includes:

- a drive transistor including a gate electrode connected to a first node, wherein the drive transistor is configured to generate a drive current in a light-emitting phase of an operation cycle of the pixel circuit;
- a storage capacitor including a first plate connected to the first node and a second plate connected to a second node, wherein the storage capacitor is configured to store a data voltage inputted to the gate electrode of the drive transistor;
- a compensation circuit including an output terminal connected to the second node and a first input terminal for receiving a first power supply voltage, wherein the compensation circuit is configured to compensate a deviation of the first power supply voltage affecting the drive current; and
- a voltage controller connected to the second node and configured to control a fluctuation of a voltage of the second node prior to the light-emitting phase.

In a third aspect, the present disclosure provides a display device. The display device including a display panel. The display panel includes a pixel circuit, and the pixel circuit includes:

- a drive transistor including a gate electrode connected to a first node, wherein the drive transistor is configured to generate a drive current in a light-emitting phase of an operation cycle of the pixel circuit;
- a storage capacitor including a first plate connected to the first node and a second plate connected to a second node, wherein the storage capacitor is configured to store a data voltage inputted to the gate electrode of the drive transistor;
- a compensation circuit including an output terminal connected to the second node and a first input terminal for receiving a first power supply voltage, wherein the compensation circuit is configured to compensate a deviation of the first power supply voltage affecting the drive current; and
- a voltage controller connected to the second node and configured to control a fluctuation of a voltage of the second node prior to the light-emitting phase.

BRIEF DESCRIPTION OF DRAWINGS

To describe the technical solutions in the embodiments of the present disclosure or in the related art more clearly, the following briefly describes the accompanying drawings required for describing the embodiments or the related art. Apparently, the accompanying drawings in the following description show some embodiments of the present disclosure, and a person skilled in the art may still derive other drawings from these accompanying drawings.

DESCRIPTION OF EMBODIMENTS

In order to make the objectives, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are some, rather than all of the embodiments of the present disclosure. All other embodiments obtained by those of ordinary skill in the art based on the embodiments of the present disclosure should fall within the protection scope of the present disclosure.

Terms used in the embodiments of the present disclosure are only for the purpose of describing specific embodiments and are not intended to limit the present disclosure. Unless otherwise specified in the context, words, such as “a”, “the”, and “this”, in a singular form in the embodiments of the present disclosure and the appended claims include plural forms.

Figure 1:
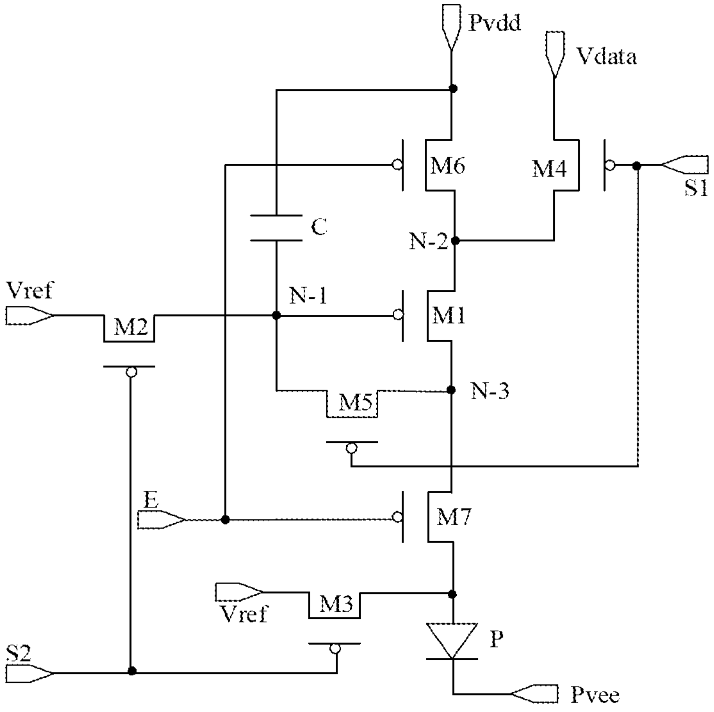
FIG. 1 is a schematic diagram of a conventional pixel circuit in the related art.

FIG. 1 is a schematic diagram of a conventional pixel circuit in the related art. As shown in FIG. 1, the pixel circuit includes a drive transistor M1, a gate electrode reset transistor M2, an anode reset transistor M3, a data writing transistor M4, a threshold compensation transistor M5, a first light-emitting control transistor M6, a second light-emitting control transistor M7, and a storage capacitor C. A gate electrode of the drive transistor M1 is connected to a node N-1, a source electrode of the drive transistor M1 is connected to a node N-2, and a drain electrode of the drive transistor M1 is connected to a node N-3. The gate electrode reset transistor M2 is connected to the node N-1. The anode reset transistor M3 is connected to an anode of a light-emitting element P. A gate electrode of the gate electrode reset transistor M2 and a gate electrode of the anode reset transistor M3 both receive a scan signal S2. The gate electrode reset transistor M2 and the anode reset transistor M3 both receive a reset signal Vref. The data writing transistor M4 is connected to the node N-2. The threshold compensation transistor M5 is connected in series between the node N-1 and a node N-3. A gate electrode of the data writing transistor M4 and a gate electrode of the threshold compensation transistor M5 both receive a scan signal S1. A gate electrode of the first light-emitting control transistor M6 and a gate electrode of the second light-emitting control transistor M7 both receive a light-emitting control signal E. A source electrode of the first light-emitting control transistor M6 receives a positive power supply voltage Pvdd, and a drain electrode of the first light-emitting control transistor M6 is connected to the node N-2. A source electrode of the second light-emitting control transistor M7 is connected to the node N-3, and a drain electrode of the light-emitting control transistor M7 is connected to the anode of the light-emitting element P. In addition, a cathode of the light-emitting element P receives a negative power supply voltage Pvee. When the pixel circuit operates, the drive transistor M1 generates a drive current $I_d$, and supplies the drive current $I_d$ to the light-emitting element P to control the light-emitting element P to emit light. The drive current $I_d$ satisfies $Id=K*(Vdata-Pvdd)^2$, where K is a constant parameter associated with the drive transistor M1.

The display panel includes multiple pixel circuits. The positive power supply voltages Pvdd received by pixel circuits at different positions in the display panel are different in voltage value, because the signal line transmitting the positive power supply voltage Pvdd has a certain impedance. When there is a current on this signal line, there is a voltage drop on this signal line. Due to the presence of the voltage drop, the positive power supply voltages Pvdd received by the pixel circuits connected to different positions of this signal line each have a deviation. The larger the sum of the drive currents of the pixel circuits connected to this signal line is, the caused deviation of the positive power supply voltage Pvdd is larger. The deviation of the positive power supply voltage Pvdd refers to the voltage value difference between the positive power supply voltage Pvdd received by the pixel circuit and the positive power supply voltage Pvdd provided by a drive chip. Since the deviation of the positive power supply voltage Pvdd affects the magnitude of the drive current $I_d$, the luminance of the pixel is affected, and non-uniform display is generated.

Figure 2:
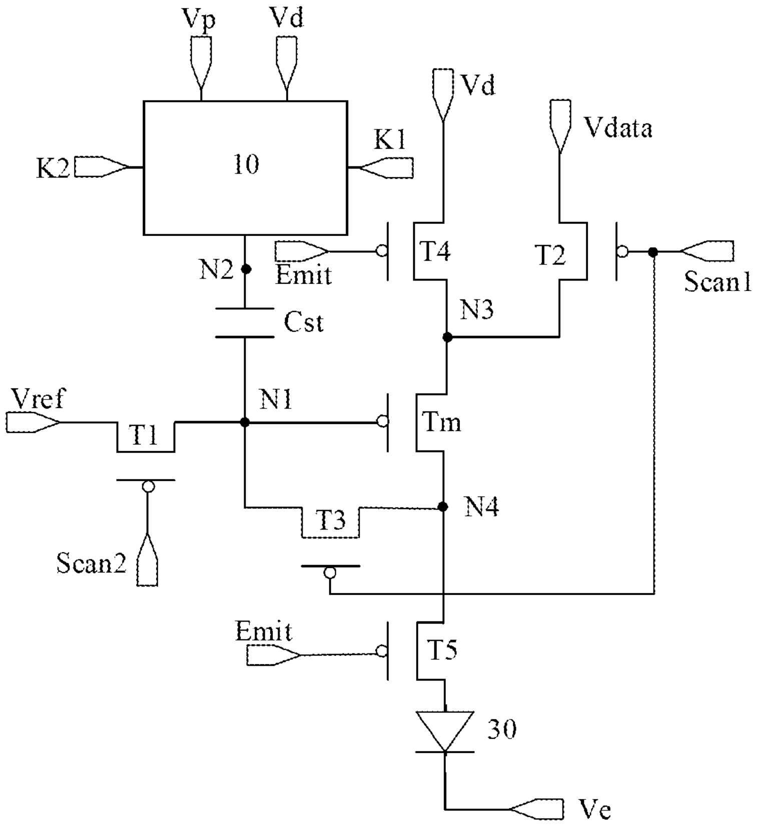
FIG. 2 is a schematic diagram of a pixel circuit according to some embodiments of the present disclosure.

Embodiments of the present disclosure provide a pixel circuit. The pixel circuit is provided with a compensation circuit and a voltage controller. The compensation circuit is configured to compensate the deviation of the power supply voltage affecting the drive current, and the voltage controller is configured to indirectly control a fluctuation of a voltage of a gate electrode of the drive transistor. In this way, the drive current outputted by the pixel circuit is prevented from suffering the voltage fluctuation, and thus the display uniformity is improved when the pixel circuit is applied in the display panel. FIG. 2 is a schematic diagram of a pixel circuit according to some embodiments of the present disclosure. As shown in FIG. 2, the pixel circuit includes a drive transistor Tm, a storage capacitor Cst, and a compensation circuit 10. A gate electrode of the drive transistor Tm is connected to a first node N1. The drive transistor Tm generates a drive current in a light-emitting phase of an operation cycle of the pixel circuit. The storage capacitor Cst includes a first plate connected to the first node N1 and a second plate connected to a second node N2. The storage capacitor Cst stores a data voltage inputted to the gate electrode of the drive transistor Tm. The compensation circuit 10 includes an output terminal connected to the second node N2, and a first input terminal for receiving a first power supply voltage Vd. The compensation circuit 10 is configured to compensate a deviation of the first power supply voltage Vd that affects the drive current.

In some embodiments of the present disclosure, the pixel circuit is connected to a first electrode of a light-emitting element 30, a power supply input terminal of the pixel circuit receives the first power supply voltage Vd, and a second electrode of the light-emitting element 30 receives a second power supply voltage Ve. In some embodiments, the first electrode is an anode of the light-emitting element 30, and the second electrode is a cathode of the light-emitting element 30. Accordingly, the first power supply voltage Vd is the positive power supply voltage, the second power supply voltage Ve is the negative power supply voltage, and the first power supply voltage Vd is greater than the second power supply voltage Ve. In conjunction with the description associated with FIG. 1, when the pixel circuit is applied in the display panel, a voltage drop is generated during the transmission of the first power supply voltage Vd on the signal line, and the voltage drop causes the voltage value difference (the deviation of the first power supply voltage Vd) between the first power supply voltage Vd actually received by the pixel circuit and the first power supply voltage Vd provided by a drive chip. Since the pixel circuits are located at different positions in the display panel, the transmission distances of the first power supply voltage Vd to these pixel circuits are different, and thus the deviations are different. The voltage value deviation of the first power supply voltage Vd affects the magnitude of the drive current. Traditionally, a plate of the storage capacitor in the pixel circuit is directly connected to the power supply voltage. In some embodiments of the present disclosure, the second plate of the storage capacitor Cst is connected to the first power supply voltage Vd through the compensation circuit 10. With the compensation circuit 10, the drive current is no longer affected by the deviation of the first power supply voltage Vd, avoiding the non-uniform display caused by the deviation of the first power supply voltage Vd.

The second plate of the storage capacitor Cst is connected to the second node N2, and the second node N2 is connected to the compensation circuit 10. The jump of the voltage signal at the control terminal of the compensation circuit 10 may affect the voltage of the second node N2. After the storage capacitor Cst stores the data voltage, the change of the voltage of the second node N2 leads to the change of the voltage of the first node N1. That means, the change of the voltage of the second node N2 affects the potential of the gate electrode of the drive transistor Tm. As a result, the voltage difference between the gate electrode and the source electrode of the drive transistor Tm is affected, the magnitude of the drive current is affected accordingly, and thus the pixel circuit may not supply an accurate drive current to the light-emitting element 30, affecting the display uniformity. For this purpose, simulations are performed to study the voltage variation at the first node N1 during the operation of the pixel circuit, where Vdata=0V in the simulation.

In an example embodiment, the compensation circuit 10 includes: a first input terminal receiving the first power supply voltage Vd, a second input terminal receiving a compensation voltage Vp, a first control terminal receiving a first control signal K1, and a second control terminal receiving a second control signal K2. The first control signal K1 controls whether the first power supply voltage Vd is inputted to the second node N2. The second control signal K2 controls whether the compensation voltage Vp is inputted to the second node N2.

Figure 3:
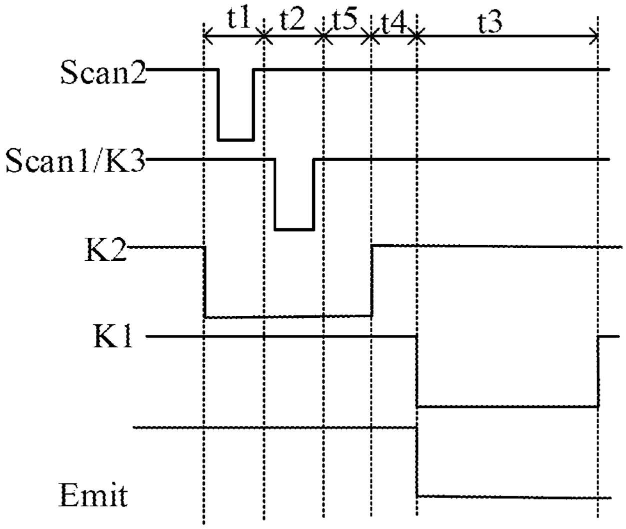
FIG. 3 is a timing diagram of the pixel circuit shown in FIG. 2 according to some embodiments of the present disclosure.
Figure 4:
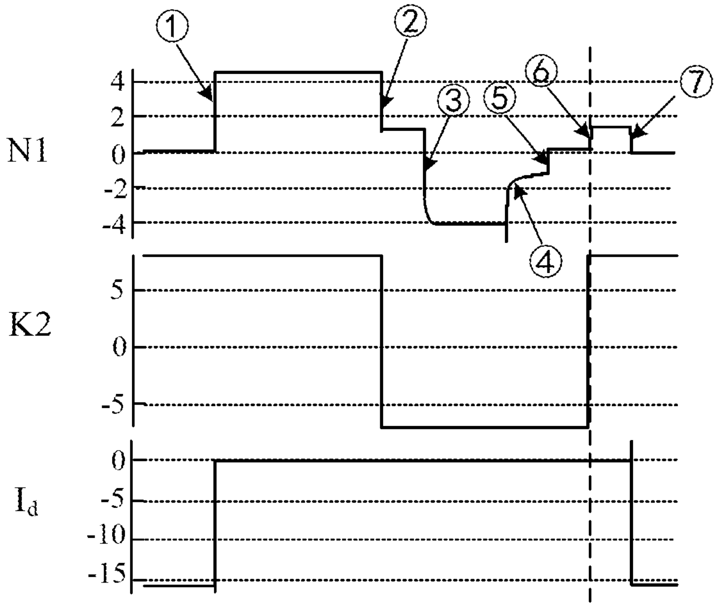
FIG. 4 is a schematic graph showing a simulation result of the operation of the pixel circuit shown in FIG. 2 according to some embodiments of the present disclosure.

FIG. 3 is a timing diagram of the pixel circuit shown in FIG. 2. FIG. 4 is a schematic graph showing a simulation result of the operation of the pixel circuit shown in FIG. 2. As shown in FIG. 3, an operation cycle of the pixel circuit includes a reset phase t1, a data writing phase t2, and a light-emitting phase t3. The following description is made with an example in which an enable signal is a low-level signal. In the reset phase t1, a scan signal Scan2 turns on a gate reset transistor T1, a reset signal Vref is inputted to the first node N1, and the second control signal K2 controls the compensation circuit 10 to input the compensation voltage Vp to the second node N2. In the data writing phase t2, a scan signal Scan1 turns on both a data writing transistor T2 and a threshold compensation transistor T3, such that the data voltage Vdata is inputted to the first node N1 and the threshold voltage of the drive transistor Tm is detected and compensated. At the same time, the compensation circuit 10 keeps on inputting the compensation voltage Vp to the second node N2 in the data writing phase t2. In the light-emitting phase t3, the first control signal K1 controls the compensation circuit 10 to input the first power supply voltage Vd to the second node N2, a light-emitting control signal Emit turns on both a first light-emitting control transistor T4 and a second light-emitting control transistor T5, and the drive transistor Tm is turned on, generates the drive current and supplies the drive current to the light-emitting element 30.

As shown in FIG. 3, the operation cycle of the pixel circuit further includes a fourth phase t4. In the fourth phase t4, the first control signal K1 and the second control signal K2 are both a disenable signal, and the compensation circuit 10 does not operate and does not supply any voltage to the second node N2. In the fourth phase t4, the second node N2 is in a floating state, and the potential of the second node N2 is easily affected by the signal jump at the control terminal of the compensation circuit 10. For example, when the second control signal K2 jumps from a low level to a high level, the potential of the second node N2 is pulled higher due to the coupling effect of the storage capacitor Cst, the potential of the first node N1 is pulled higher by the increased potential of the second node N2.

The first curve in FIG. 4 shows a voltage change at the first node N1 in the operation cycle of the pixel circuit, where the ordinate is expressed in volts. The second curve in FIG. 4 shows the timing of the second control signal K2, where the ordinate is expressed in volts. The third curve in FIG. 4 shows the timing of the drive current $I_d$, where the ordinate is expressed in microampere. As shown in FIG. 4, at the position ⑥ in the voltage change curve of the first node N1, the second control signal K2 jumps from a low level to a high level (i.e., a rising edge of the second control signal K2) and causes the potential of the first node N1 to be pulled higher. If the drive transistor Tm is a P-type transistor, the pulled-higher potential of the first node N1 causes a reduction of the drive current supplied by the pixel circuit. Apparently, the signal jump at the control terminal of the compensation circuit 10 affects the potential of the first node N1, which verifies the inventor's analysis. In other words, since the second node N2 is in the floating state in the fourth phase t4, the potential of the second node N2 is easily affected by the signal jump at the control terminal of the compensation circuit 10 in the fourth phase t4. The voltage change of the second node N2 will lead to the voltage change at the first node N1, and thus the potential of the gate electrode of the drive transistor Tm is affected, further affecting the voltage difference between the gate electrode and the source electrode of the drive transistor Tm and affecting the drive current. Accordingly, the display uniformity is affected when the pixel circuit is applied in the display panel.

In addition, the voltage change of the first node N1 shown in FIG. 4 is set forth below. At the position ①, the voltage of the first node N1 increases, which is a result of the affecting of the voltage jump of the light-emitting control signal Emit. At the position ②, the voltage of the first node N1 decreases, which is a result of the affecting of a falling edge of the second control signal K2. At the position ③, the voltage of the first node N1 decreases, which corresponds to a starting moment of the reset phase t1. In the reset phase t1, a low-level reset signal Vref is inputted to the first node N1. At the position ④, the voltage of the first node N1 increases, which corresponds to the data writing phase t2. The voltage of the first node N1 increases with a higher rate in an initial period of the data writing phase t2 and increases with a lower rate in a subsequent period of the data writing phase t2. At the position ⑤, the voltage of the first node N1 increases, which is a result of the affecting of a rising edge of a scan signal Scan1. At the position ⑦, the voltage of the first node N1 decreases, which is a result of affecting of a falling edge of the light-emitting control signal Emit.

Based on analysis of the above simulations, the inventors found that the signal jump at the control terminal of the compensation circuit 10 causes voltage fluctuation at the gate electrode of the drive transistor Tm. In order to avoid the voltage fluctuation at the gate electrode of the drive transistor Tm, the pixel circuit in some embodiments of the present disclosure is further provided with a voltage controller connected to the second node N2, and the voltage controller controls the voltage fluctuation at the second node N2 prior to the light-emitting phase. Since the voltage difference between two plates of the storage capacitor Cst may not change instantly, if the voltage fluctuation at the second node N2 is controlled, then the voltage fluctuation at the first node N1 is controlled, and the drive current generated in the light-emitting phase is prevented from being affected by the voltage fluctuation at the first node N1, thereby improving the display uniformity and ensuring the display effect.

Figure 5:
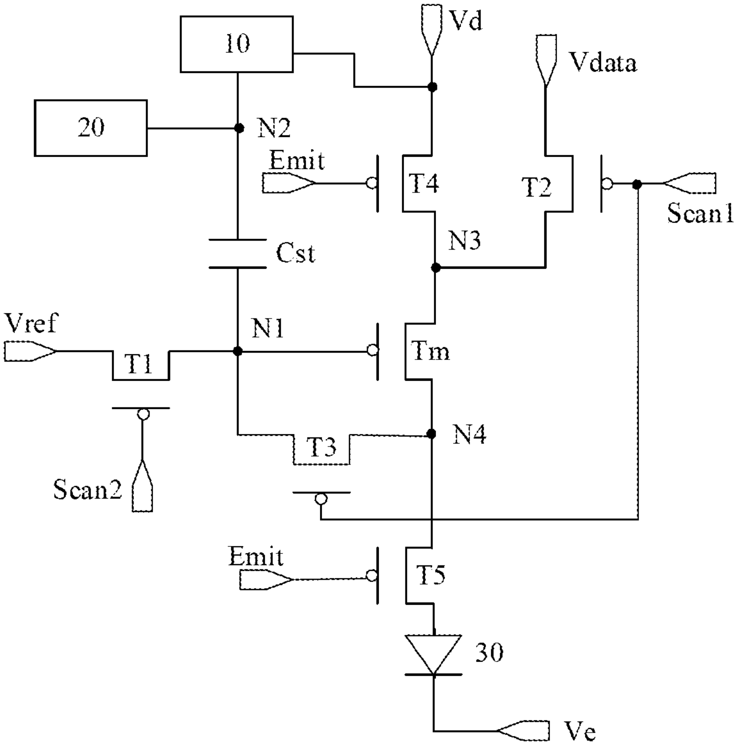
FIG. 5 is a schematic diagram of a pixel circuit according to some embodiments of the present disclosure.

FIG. 5 is a schematic diagram of a pixel circuit according to some embodiments of the present disclosure. As shown in FIG. 5, the pixel circuit includes a drive transistor Tm, a storage capacitor Cst, a compensation circuit 10 and a voltage controller 20. A gate electrode of the drive transistor Tm is connected to a first node N1. The drive transistor Tm is configured to generate a drive current in a light-emitting phase of an operation cycle of the pixel circuit. The storage capacitor Cst includes a first plate connected to the first node N1 and a second plate connected to a second node N2. The storage capacitor Cst is configured to store a data voltage inputted to the gate electrode of the drive transistor Tm. The compensation circuit 10 includes an output terminal connected to the second node N2, and a first input terminal for receiving a first power supply voltage Vd. The compensation circuit 10 is configured to compensate a deviation of the first power supply voltage Vd that affects the drive current. The voltage controller 20 is connected to the second node N2 and configured to control a fluctuation of a voltage of the second node N2 prior to the light-emitting phase.

The pixel circuit provided by embodiments of the present disclosure includes a drive transistor Tm and a storage capacitor Cst. The gate electrode of the drive transistor Tm and the first plate of the storage capacitor Cst are connected to the first node N1, and the second plate of the storage capacitor is connected to the second node N2. The pixel circuit further includes a voltage controller 20 and a compensation circuit 10 connected to the second node N2. The storage capacitor Cst is connected to the first power supply voltage Vd through the compensation circuit 10. The compensation circuit 10 compensates the deviation of the first power supply voltage Vd affecting the drive current, such that the drive current is not affected by the deviation of the first power supply voltage Vd, avoiding the non-uniform display caused by the deviation of the first power supply voltage Vd. In addition, the voltage controller 20 controls the fluctuation of the voltage of the second node N2 prior to the light-emitting phase. Since the voltage difference between two plates of the storage capacitor Cst may not change instantly, the voltage fluctuation of the first node N1 is controlled by controlling the voltage fluctuation of the second node N2, avoiding that the voltage fluctuation of the first node N1 affects the magnitude of the drive current. In this way, the display uniformity is improved, and the display effect is ensured.

As shown in FIG. 2 and FIG. 5, the pixel circuit further includes a gate reset transistor T1, a data writing transistor T2, a threshold compensation transistor T3, a first light-emitting control transistor T4 and a second light-emitting control transistor T5. A first electrode of the drive transistor Tm is connected to a third node N3, and a second electrode of the drive transistor Tm is connected to a fourth node N4. The data writing transistor T2 is connected to the third node N3. The threshold compensation transistor T3 is connected in series between the fourth node N4 and the first node N1. The operation cycle of the pixel circuit at least includes a rest phase, a data writing phase, and a light-emitting phase. In the reset phase, the gate reset transistor Tm is turned on under action of a scan signal Scan2, and the first node N1 is reset by a reset signal Vref. In other words, the gate electrode of the drive transistor Tm is reset in the light-emitting phase. In the data writing phase, the data writing transistor T2 and the threshold compensation transistor T3 are turned on under action of a scan signal Scan1, a data voltage Vdata is inputted to the first node N1, and the threshold voltage of the drive transistor Tm is detected and compensated. In the light-emitting phase, the first light-emitting control transistor T4 and the second light-emitting control transistor T5 are turned on under action of a light-emitting control signal Emit. In the light-emitting phase, the drive transistor Tm generates a drive current and supplies the drive current to the light-emitting element 30 to cause the light-emitting element 30 to emit light.

The first electrode of the drive transistor Tm may be a source electrode, and a second electrode of the drive transistor Tm may be a drain electrode.

For illustration, the transistors in the pixel circuit are all P-type transistors. In some embodiments, the transistors in the pixel circuit are all N-type transistors.

In some embodiments, the drive transistor Tm is a P-type transistor, whereas the gate reset transistor T1 and the threshold compensation transistor T3 are N-type transistors. Such arrangement can reduce a leakage current at the first node N1, ensuring a stable potential of the first node N1. When the pixel circuit is applied in a low frequency display manner, a flicker problem can be improved.

In some embodiments, the pixel circuit further includes an electrode reset transistor connected to an electrode of the light-emitting element. For example, the electrode reset transistor is connected to an electrode of the light-emitting element 30 that is connected to the second light-emitting control transistor T5. The electrode reset transistor is configured to reset the potential of the electrode of the light-emitting element 30.

The voltage controller 20 is configured to control the fluctuation of the voltage of the second node N2 after the data writing phase. The storage capacitor Cst stores the data voltage in the data writing phase and holds a stable potential at the first node N1 in the light-emitting phase, such that the drive transistor Tm keeps generating a stable drive current in the light-emitting phase. Therefore, the potential stability of the second node N2 in the data writing phase and the subsequent light-emitting phase is a key factor affecting the light-emitting of the light-emitting element 30. In some embodiments of the present disclosure, the voltage controller 20 works subsequent to the data writing phase, and thus does not affect the operation of the data writing phase, ensuring that the accurate data voltage is stored into the storage capacitor Cst. After the data input and storage complete, the voltage controller 20 controls the fluctuation of the voltage of the second node N2. Since the voltage difference between the two plates of the storage capacitor Cst may not change instantly, controlling the voltage fluctuation of the second node N2 ensures controlling the voltage fluctuation of the first node N1, and thus the magnitude of the drive current is prevented from being affected by the voltage fluctuation of the first node N1, thereby improving the display uniformity and improving the display effect.

Figure 6:
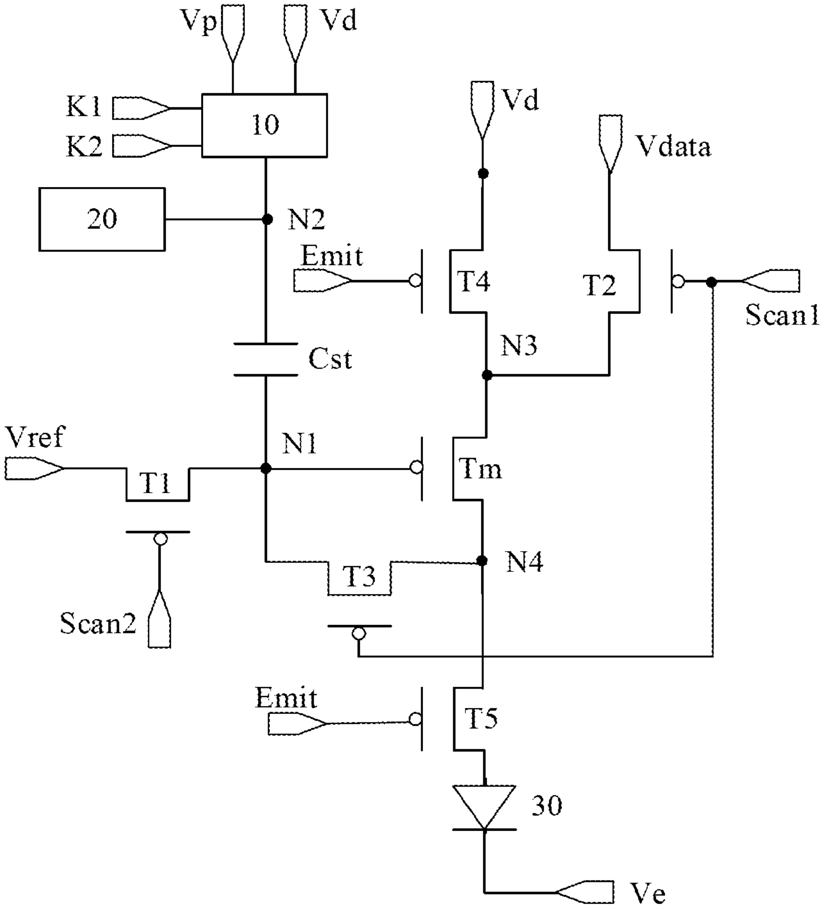
FIG. 6 is a schematic diagram of a pixel circuit according to some embodiments of the present disclosure.

FIG. 6 is a schematic diagram of a pixel circuit according to some embodiments of the present disclosure. In some embodiments, as shown in FIG. 6, the compensation circuit 10 includes a first input terminal and a second input terminal. The first terminal receives the first power supply voltage Vd, and the second terminal receives a compensation voltage Vp. The compensation circuit 10 further includes a first control terminal and a second control terminal. The first control terminal receives a first control signal K1, and the second control terminal receives a second control signal K2. Under the action of the first control signal K1, the compensation circuit 10 inputs the first power supply voltage Vd to the second node N2. Under the action of the second control signal K2, the compensation circuit 10 inputs the compensation voltage Vp to the second node N2. In the operation cycle of the pixel circuit, an enable duration of the first control signal K1 and an enable duration of the second control signal K2 do not overlap. In the present embodiment, the two input terminals of the compensation circuit 10 receive the first power supply voltage Vd and the compensation voltage Vp, respectively, and the inputting of the first power supply voltage Vd and the inputting of the compensation voltage Vp are controlled by the first control signal K1 and the second control signal K2, respectively.

The timing diagram shown in FIG. 3 is also applicable to the pixel circuit provided by the embodiment of FIG. 6. As shown in FIG. 3, the enable duration of the first control signal K1 and the enable duration of the second control signal K2 do not overlap, the enable duration of the first control signal K1 is basically in the light-emitting phase t3, and the enable duration of the second control signal K2 is prior to the light-emitting phase t3. In the operation cycle of the pixel circuit, an ending time (such as the rising edge of the second control signal K2 in FIG. 3) of the enable duration of the second control signal K2 in the operation cycle of the pixel circuit is prior to a starting moment (such as a falling edge of the first control signal K1 in FIG. 3) of the enable duration of the first control signal K1. In this way, it is ensured that the process of inputting the compensation voltage Vp into the second node N2 ends prior to the first power supply voltage Vd is inputted into the second node N2. In this embodiment, the compensation circuit 10 inputs the compensation voltage Vp and the first power supply voltage Vd in different phases of the operation cycle of the pixel circuit, such that the deviation of the first power supply voltage Vd affecting the drive current is compensated.

As shown in FIG. 3, the operation cycle of the pixel circuit further includes a fourth phase t4 that is subsequent to the data writing phase t2 and prior to the light-emitting phase t3. In the fourth phase t4, both the first control signal K1 and the second control signal K2 are disenabled, the compensation circuit 10 does not work, and the second node N2 is in the floating state. In the fourth phase t4, the potential of the second node N2 is easily affected by the signal jump at the control terminal of the compensation circuit 10. For example, when the second control signal K2 jumps from a low level to a high level, the potential of the second node N2 is pulled higher. Since the storage capacitor Cst is connected between the second node N2 and the first node N1, the pulling-higher of the potential of the second node N2 causes the potential of the first node N1 to be pulled higher, and the drive current in the light-emitting phase t3 is reduced accordingly, leading to a reduction of the luminance of the light-emitting element. In some embodiments of the present disclosure, the voltage controller 20 is provided to control the fluctuation of the voltage of the second node N2 prior to the light-emitting phase t3, and thus the potential of the second node N2 is prevented from being severely affected by the jump of the second control signal K2, reducing the fluctuation of the voltage of the second node N2. Accordingly, the potential of the first node N1 is prevented from being pulled higher severely, and the display uniformity is improved. In addition, when the potential of the first node N1 is pulled higher, the drive current is reduced, and the light-emitting efficiency of the light-emitting element is affected by the reduction of the drive current. In some embodiments of the present disclosure, the voltage controller 20 can indirectly control the pulling-higher of the potential of the first node N1, and thus the light-emitting efficiency is not affected.

Figure 7:
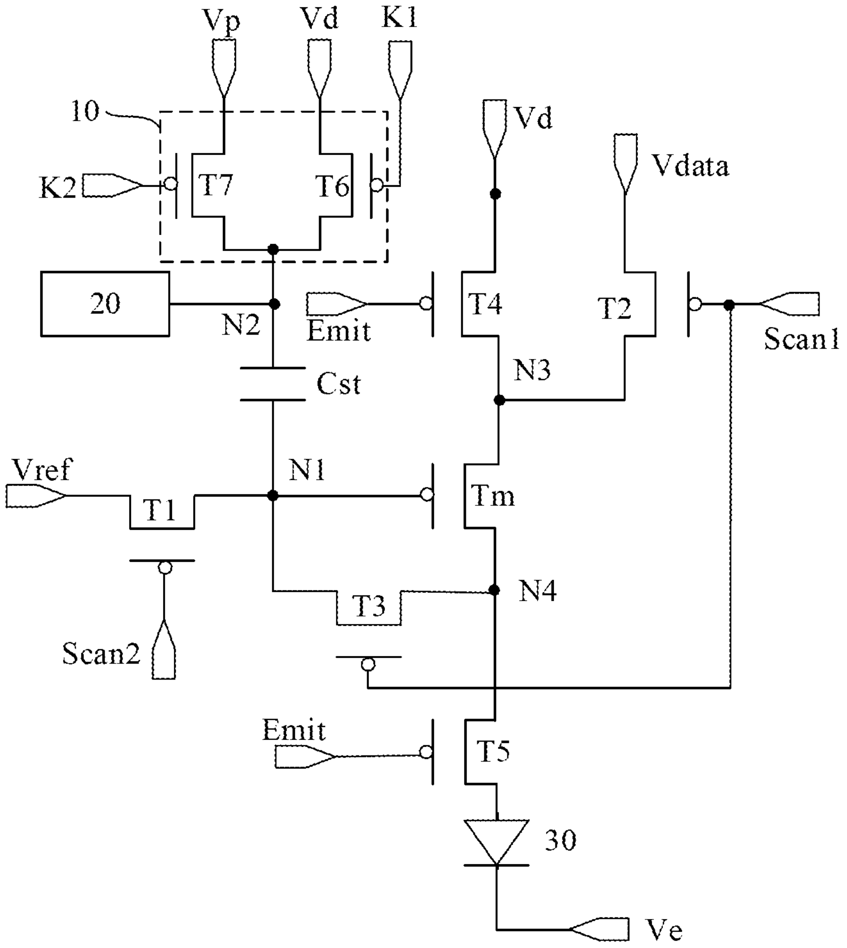
FIG. 7 is a schematic diagram of a pixel circuit according to some embodiments of the present disclosure.

FIG. 7 is a schematic diagram of a pixel circuit according to some embodiments of the present disclosure. In some embodiments, as shown in FIG. 7, the compensation circuit 10 includes a first transistor T6 and a second transistor T7. The first transistor T6 includes a gate electrode receiving the first control signal K1, a first electrode receiving the first power supply voltage Vd, and a second electrode connected to the second node N2. The second transistor T7 includes a gate receiving the second control signal K2, a first electrode receiving the compensation voltage Vp, and a second electrode connected to the second node N2.

The operation process of the pixel circuit shown in FIG. 7 is set forth below in conjunction with the timing diagram shown in FIG. 3.

In the reset phase t1, the gate reset transistor T1 is turned on by a scan signal Scan2, and the second transistor T7 is turned on by the second control signal K2. The turn-on gate reset transistor T1 inputs a reset signal Vref to the first node N1, and thus the potential of the first node N1 is Vref. The turn-on second transistor T2 inputs the compensation voltage Vp to the second node N2, and thus the potential of the second node N2 is Vp.

In the data writing phase t2, the data write transistor T2 and the threshold compensation transistor T3 are turned on by the scan signal Scan1. The data voltage Vdata is inputted to the first node N1, and the threshold voltage of the drive transistor Tm is detected and compensated. In addition, the second transistor T7 is still in the turn-on state in the data writing phase t2. After the data voltage inputting completes, the voltage of the second node N2 is the compensation voltage Vp, and the voltage of the first node N1 is Vdata+Vth, where Vth is the threshold voltage of the drive transistor Tm.

In a fifth phase t5, the second control signal K2 is kept in the low-level state, and the second transistor T7 is kept in the turn-on state. At the ending moment of the fifth phase, the second control signal K2 changes from the low level to the high level, the second transistor T7 is turned off accordingly, and the compensation voltage Vp is not supplied to the second node N2.

In the fourth phase t4, the second control signal K2 and the first control signal K1 are both at the high level, no signal is inputted to the second node N2 accordingly, and the second node N2 is in the floating state. As stated in the description of embodiment of FIG. 4, the potential of the second node N2 is easily affected by the rising edge of the second control signal K2. In the fourth phase, the fluctuation of the voltage of the second node N2 is controlled using the voltage controller 20, the potential of the second node N2 is prevented from being severely affected by the jump of the second control signal K2, the fluctuation of the voltage of the second node N2 is reduced, and the potential of the first node N1 is prevented from being pulled too higher.

In the light-emitting phase t3, the first transistor T6 is turned on by the first control signal K1, and the first power supply voltage Vd is inputted to the second node N2. With the voltage controller 20, the voltage of the second node N2 is not affected by the jump of the first control signal K1 and the jump of the second control signal K2. In the initial time of the light-emitting phase t3, the second node N2 is at an ideal potential inputted when the second transistor T7 is turned on, that is, the second node N2 at the compensation voltage Vp. After the first transistor T6 is turned on, the potential of the second node N2 is changed from the compensation voltage Vp to the first power supply voltage Vd. The potential change amount $\Delta VN_2$ of the second node N2 is Vd-Vp. At the same time, due to the coupling effect of the storage capacitor Cst, the voltage of the first node N1 changes as the voltage of the second node N2 changes, so the voltage of the first node N1 changes from $Vdata+Vth+\Delta VN_2$, i.e., Vd−Vp+Vdata+Vth. In the light-emitting phase, both the first light-emitting control transistor T4 and the second light-emitting control transistor T5 are turned on by the light-emitting control signal Emit, and the drive transistor Tm is turned on, generates the drive current, and supplies the drive current to the light-emitting element 30.

The calculation formula of the drive current is $Id=K^*(Vgs-|Vth|)^2$, where Vgs is a voltage difference between the gate electrode and the source electrode of the drive transistor Tm. In the light-emitting phase t3, Vgs is the voltage difference between the gate electrode and the source electrode of the drive transistor Tm, that is, Vgs is the voltage difference between the first node N1 and the third node N3. The voltage of the first node N1 is Vd−Vp+Vdata+Vth. The voltage of the third node N3 is the first power supply voltage Vd that is supplied to the third node N3 after the first light-emitting control transistor T4 is turned on. Therefore, Vgs=Vdata−Vp+Vth. By substituting the Vgs into the calculation formula of the drive current, we can obtain $Id=K^*(Vdata-Vp)^2$.

Thus, the drive current $I_d$ only depends on the data voltage Vdata and the compensate voltage Vp and is independent of the threshold voltage Vth of the drive transistor Tm and the first power supply voltage Vd. In this way, the compensation circuit 10 compensates the deviation of the first power supply voltage Vd that affects the drive current, such that the drive current is not affected by the deviation of the first power supply voltage Vd anymore, avoiding the non-uniform display caused by the deviation of the first power supply voltage Vd.

As shown in FIG. 3 and FIG. 7, the gate electrode of the data writing transistor T2 receives a scan signal Scan1 in the operation cycle of the pixel circuit, and the scan signal Scan1 may be referred to as a third control signal K3. The third control signal K3 provides an enable signal controlling the turning on of the data writing transistor T2. In the operation cycle of the pixel circuit, an ending moment of the enable duration of the third control signal K3 is prior to the ending moment of the enable duration of the second control signal K2. In other words, after the data writing completes, the process of inputting the compensation voltage Vp to the second node N2 through the second transistor T7 ends. After the data writing completes, the voltage of the first node N1 is Vdata+Vth. After the process of inputting the compensation voltage Vp to the second node N2 through the second transistor T7 ends, the voltage of the second node N2 is Vp. After the data writing completes, a voltage difference is maintained between two plates of the storage capacitor Cst. After the process of inputting the compensation voltage Vp to the second node N2 through the second transistor T7 ends, the voltage jump of the second control signal K2 pulls the potential of the second node N2 higher, and the potential of the first node N1 is changed due to the coupling effect of the storage capacitor Cst. With the arrangement that the ending moment of the enable duration of the third control signal K3 is prior to the ending moment of the enable duration of the second control signal K2, the voltage difference between two plates of the storage capacitor Cst is associated with the compensation voltage Vp, and the affecting of the first power supply voltage Vd on the drive current can be eliminated according to the calculation formula of the drive current in the light-emitting phase, such that the magnitude of the drive current is independent of the first power supply voltage Vd.

In some embodiments of the present disclosure, with the action of the first control signal K1, the first transistor T6 is turned on in the light-emitting phase t3 and is turned off in other phases. The first control signal K1 may be an additional signal. Alternatively, another control signal of the pixel circuit is reused as the first control signal K1.

Figure 8:
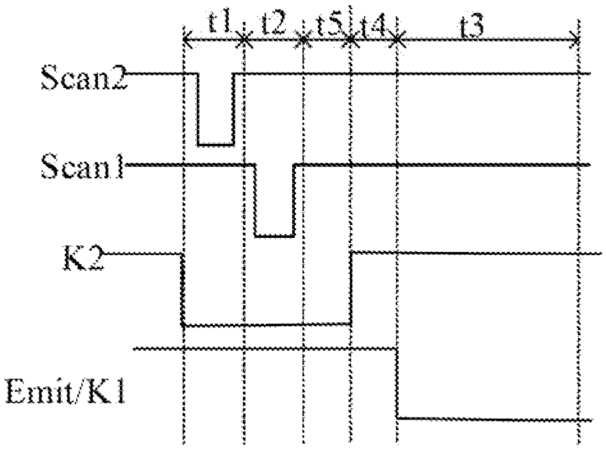
FIG. 8 is a timing diagram of the pixel circuit shown in FIG. 7 according to some embodiments of the present disclosure.

FIG. 8 is a timing diagram of the pixel circuit shown in FIG. 7. In some embodiments, as shown in FIG. 8, the light-emitting control signal Emit is reused as the first control signal K1. In other words, the first control terminal of the compensation circuit 10 in the pixel circuit receives the light-emitting control signal Emit, that is, the control terminal of the first transistor T6 receives the light-emitting control signal Emit. In the operation cycle of the pixel circuit, the first transistor T6 is turned on simultaneously with the first light-emitting control transistor T4 and the second light-emitting control transistor T5, and is turned off simultaneously with the first light-emitting control transistor T4 and the second light-emitting control transistor T5. With such arrangement, it is ensured that the first transistor T6 inputs the first power supply voltage Vd into the second node N2 in the light-emitting phase t3, and the first transistor T6 and the second transistor T7 cooperate to compensate for the deviation of the first power supply voltage Vd. By reusing the light-emitting control signal Emit as the first control signal K1, the number of control signals required by the pixel circuit is reduced. When the pixel circuit is applied in the display panel, the number of signal lines in the display panel is reduced, saving the wire routing space in the display panel.

Figure 9:
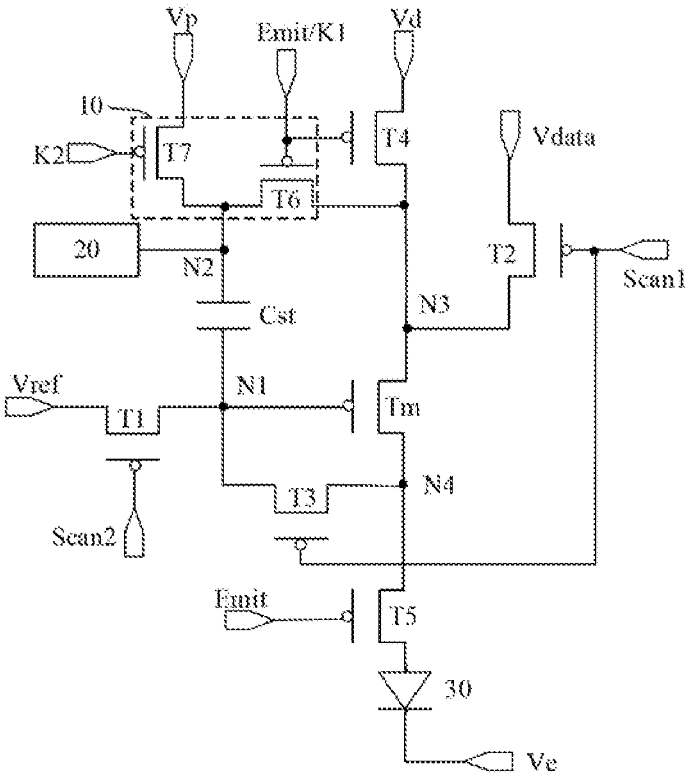
FIG. 9 is a schematic diagram of a pixel circuit according to some embodiments of the present disclosure.

FIG. 9 is a schematic diagram of a pixel circuit according to some embodiments of the present disclosure. In some embodiments, as shown in FIG. 9, a first electrode of the first light-emitting control transistor T4 receives the first power supply voltage Vd. The compensation circuit 10 includes a first transistor T6 and a second transistor T7. The first transistor T6 includes a gate electrode receiving the light-emitting control signal Emit, a first electrode connected to the second electrode of the first light-emitting control transistor T4, and a second electrode connected to the second node N2. The second transistor T7 includes a gate electrode receiving a second control signal K2, a first electrode receiving the compensation voltage Vp, and a second electrode connected to the second node N2. The operation timing of the pixel circuit in this embodiment may be understood in conjunction with the time diagram of FIG. 8. The difference between the embodiment shown in FIG. 9 and the embodiment shown in FIG. 7 is only in the way the first transistor T6 in the compensation circuit 10 receives the first power supply voltage Vd. In the embodiment of FIG. 7, the first electrode of the first transistor T6 directly receives the first power supply voltage Vd. In the embodiment of FIG. 9, the first electrode of the first transistor T6 receives the first power supply voltage Vd after the first light-emitting control transistor T4 is turned on. In the embodiment of FIG. 9, the light-emitting control signal Emit turns on the first light-emitting control transistor T4 and the first transistor T6 simultaneously in the light-emitting phase t3. The first power supply voltage Vd is transmitted to the first electrode of the first transistor T6 through the first light-emitting control transistor T4 and then inputted into the second node N2 through the first transistor T6, such that the potential of the second node N2 jumps from the compensation voltage Vp to the first power supply voltage Vd. Accordingly, the voltage of the first node N1 jumps to Vd-Vp+Vdata+Vth due to the coupling effect of the storage capacitor Cst.

In the embodiments of the present disclosure, the voltage value of the first power supply voltage Vd received by the first input terminal of the compensation circuit 10 is V1, the voltage value of the compensation voltage Vp received by the second input terminal of the compensation circuit 10 is V2, and V2>V1. The compensation voltage Vp may be an ideal power supply voltage. In some embodiments, the compensation voltage Vp is a power supply voltage supplied by a drive chip and having no voltage drop loss. V2=V1+ΔV, where ΔV is the voltage drop generated by the transmission of the first power supply voltage Vd on a signal line. By setting the power supply voltage supplied by the drive chip as the compensation voltage Vp, the difference between the compensation voltage Vp and the first power supply voltage Vd connected to the pixel circuit is reduced, that is, the voltage jumping amount of the second node N2 is reduced. Accordingly, the voltage jumping amount of the first node N1 is reduced, and the influence on the magnitude of the drive current is reduced.

In some embodiments, the compensation voltage Vp is an ideal voltage. The compensation circuits 10 in the pixel circuits in the display panel receive compensation voltages Vp having a same magnitude. The magnitude of the compensation voltage Vp may be greater than the magnitude of the power supply voltage outputted by the drive chip. Alternatively, the magnitude of the compensation voltage Vp may be less than the magnitude of the power supply voltage outputted by the drive chip.

In the display panel including the above pixel circuit, dedicated circuits are provided for supplying the compensation voltage Vp, such that the compensation voltage Vp is transmitted without voltage drop. In this way, the pixel circuits at different positions of the display panel receive the compensation voltages Vp having a same magnitude, and thus the drive current generated by the pixel circuit is not affected by the voltage drop, improving the non-uniform display caused by voltage drop.

Figure 10:
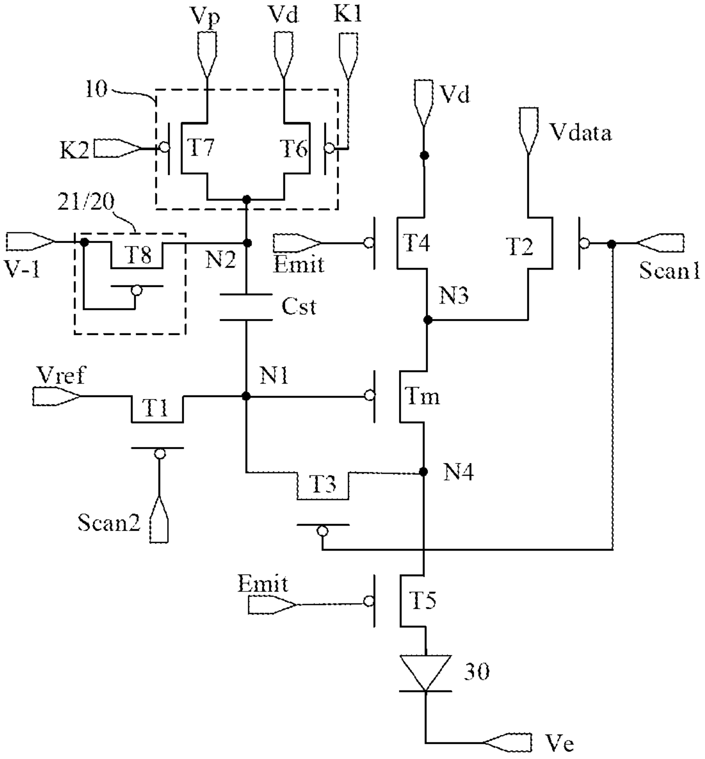
FIG. 10 is a schematic diagram of a pixel circuit according to some embodiments of the present disclosure.

FIG. 10 is a schematic diagram of a pixel circuit according to some embodiments of the present disclosure. In some embodiments, as shown in FIG. 10, the voltage controller 20 includes a voltage limiting circuit 21. A first terminal of the voltage limiting circuit 21 receives a first voltage V_1, and a second terminal of the voltage limiting circuit 21 is connected to the second node N2. The voltage limiting circuit 21 is turned on when the voltage of the second node N2 is greater than the first voltage V_1, so as to pull lower the voltage of the second node N2. The voltage limiting circuit 21 limits the voltage of the second node N2. As shown in the timing diagram of FIG. 8, the light-emitting control signal Emit is reused as the first control signal K1. In the fourth phase t4, the second node N2 is in the floating state. In the process the second control signal K2 jumps from a low level to a high level, the voltage of the second node N2 is pulled higher. When the pulled-higher voltage of the second node N2 is greater than the first voltage V_1, the voltage limiting circuit 21 pulls the pulled-higher voltage of the second node N2 lower. In this way, the fluctuation of the voltage of the second node N2 is controlled, the voltage of the second node N2 is prevented from being heavily affected by the jump of the second control signal K2, the voltage fluctuation at the second node N2 is reduced, and thus the voltage of the first node N1 is prevented from being pulling too high. Accordingly, it is avoided that the voltage fluctuation at the first node N1 affects the magnitude of the drive current, the display uniformity is improved, the display effect is ensured, and at the same time the light-emitting efficiency is prevented from being affected by the reduction of the drive current.

In some embodiments, as shown in FIG. 10, the voltage limiting circuit 21 includes a voltage limiting transistor T8. A gate electrode of the voltage limiting transistor T8 is connected to a first electrode of the voltage limiting transistor T8. A second electrode of the voltage limiting transistor T8 is connected to the second node N2. The first electrode of the voltage limiting transistor T8 receives the first voltage V_1. With connecting the gate electrode of the voltage limiting transistor T8 to its first electrode, and the voltage limiting transistor T8 is equivalent to a diode structure, which has a characteristic of unidirectional conducting. When the voltage of the second node N2 is greater than the first voltage V_1, the voltage limiting transistor T8 is turned on, and current flows from the second node N2 to the first electrode T8, such that the voltage of the second node N2 is pulled lower.

Figure 11:
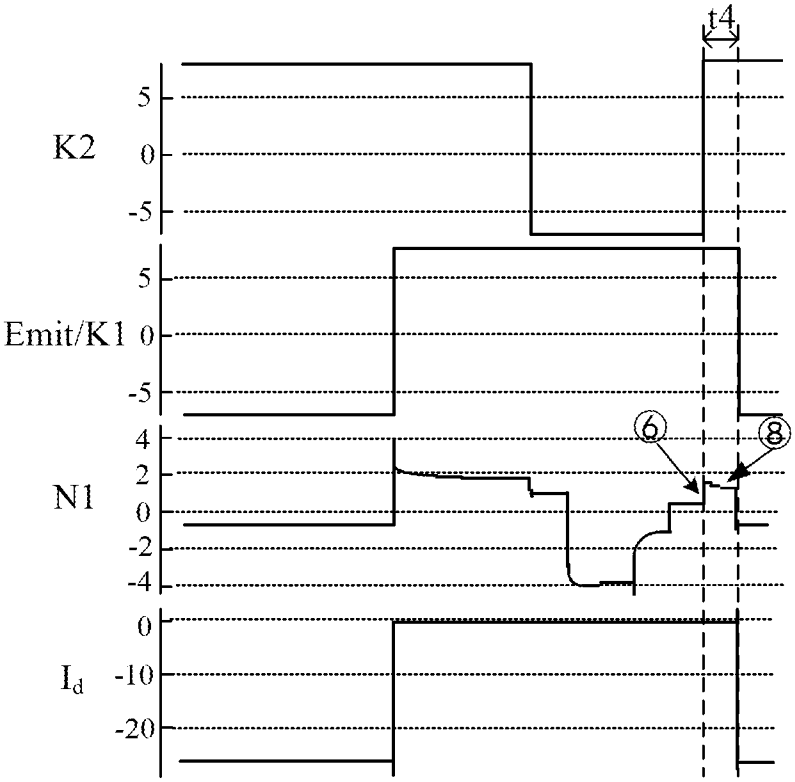
FIG. 11 is a schematic graph showing a simulation result of the operation of the pixel circuit shown in FIG. 10 according to some embodiments of the present disclosure.

The operation process of the pixel circuit in the embodiment of FIG. 10 is simulated, and the voltage change of the first node N1 in the operation process of the pixel circuit is studied. In the simulation, Vdata is set to 0V. FIG. 11 is a schematic graph showing a simulation result of the operation of the pixel circuit shown in FIG. 10. The first curve in FIG. 11 is the timing diagram of the second control signal K2, where the ordinate is expressed in volts. The second curve in FIG. 11 is the timing diagram of the light-emitting control signal Emit, where the ordinate is expressed in volts. The third curve in FIG. 11 is a schematic diagram showing the voltage change of the first node N1 in the operation cycle of the pixel circuit, where the ordinate is expressed in volts. The fourth curve in FIG. 11 is the timing diagram of the drive current Id, where the ordinate is expressed in volts. As shown in FIG. 11, at the position ⑥, the potential of the first node N1 is pulled higher due to the affecting of the rising edge of the second control signal K2. FIG. 11 shows the fourth phase t4. As shown in FIG. 11, the potential of the first node N1 has a decreasing process (the position indicated by the black arrow ⑧) in the fourth phase t4. It can be verified that after the voltage limiting transistor T8 is turned on, current flows from the second node N2 to the first node N1 of the voltage limiting transistor T8, such that the potential of the second node N2 is pulled lower.

In this embodiment, the voltage limiting transistor T8 is connected to the second node N2. The voltage fluctuation of the second node N2 is controlled by the voltage limiting transistor T8, avoiding that the voltage fluctuation of the second node N2 causes the voltage fluctuation of the first node N1 and further affects the drive current. Therefore, the display uniformity is improved, and the display effect is ensured. In addition, when the first control signal K1 jumps from the high level to the low level, the potential of the second node N2 is pulled lower. Since the voltage limiting transistor T8 is unidirectional conducting, there is no current flowing from the first electrode of the voltage limiting transistor T8 to the second node N2. The pulling-lower of the potential of the second node N2 will pull lower the potential of the first node N1 due to the coupling effect, thereby increasing the drive current and improving the light-emitting efficiency.

In some embodiments, the voltage limiting transistor T8 and the drive transistor Tm are of the same type. For example, the voltage limiting transistor T8 and the drive transistor Tm are both P-type transistors. With such arrangement, when the pixel circuit is applied in the display panel, the manufacturing process of the display panel is simplified.

In some embodiments, the voltage value of the first voltage V_1 is greater than the voltage value of the first power supply voltage Vd received by the first input terminal of the compensation circuit 10. In conjunction with the timing diagram shown in FIG. 3 and the associated description, when the voltage of the second node N2 is pulled higher due to coupling and the jump of the second control signal K2, the pulled-higher voltage of the second node N2 is greater than the first voltage V_1, the voltage limiting transistor T8 is turned on and generates the current, and thus the voltage of the second node N2 is pulled lower, thereby controlling the voltage fluctuation of the first node N1. After the data writing phase t2 ends, the voltage of the first node N1 is Vdata+Vth, and the voltage of the second node N2 is the compensation voltage Vp. The ending moment of the process of inputting the compensation voltage Vp to the second node N2 by the compensation circuit 10 is after the data writing ends. The first power supply voltage Vd is inputted to the second node N2 in the light-emitting phase t3, the voltage of the second node N2 changes from the compensation voltage Vp to the first power supply voltage Vd, and thus the voltage of the first node N1 changes due to the coupling effect of the storage capacitor. As a result, the drive current generated in the light-emitting phase t3 is independent of the first power supply voltage Vd. In other words, the voltage of the second node N2 needs to maintain the first power supply voltage Vd in the light-emitting phase t3. In the embodiments of the present disclosure, the voltage value of the first voltage V_1 is greater than the voltage value of the first power supply voltage Vd received by the first input terminal of the compensation circuit 10, so the voltage of the second node N2 is less than the first voltage V_1 in the light-emitting phase t3, and the voltage limiting transistor T8 is in a turn-off state. In this way, in the light-emitting phase t3, the voltage of the second node N2 is not affected by the voltage controller 20 and does not change, the potential stability of the second node N2 is ensured, the potential stability of the first node N1 is ensured, and the pixel circuit can provide a stable drive current.

Figure 12:
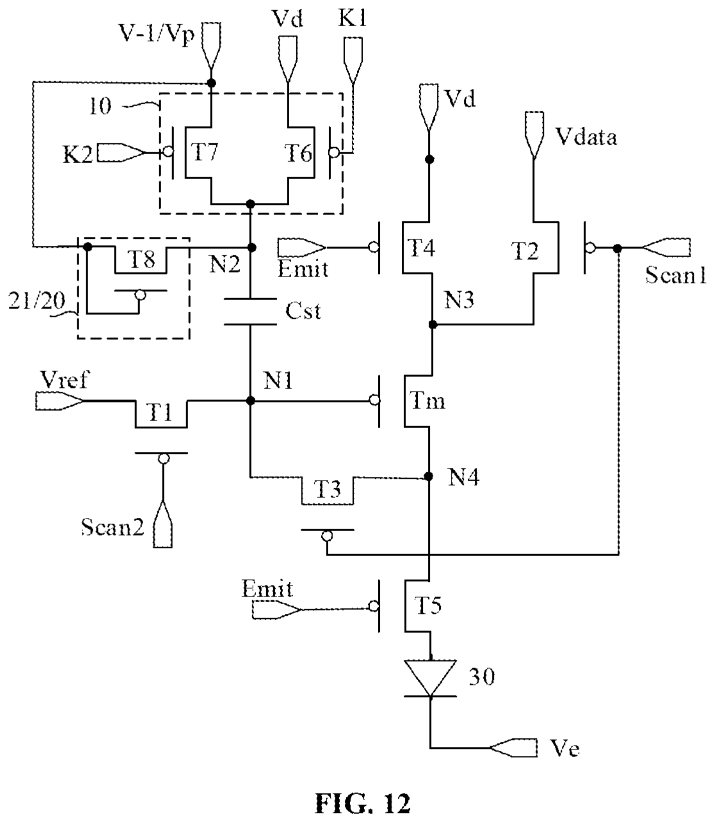
FIG. 12 is a schematic diagram of a pixel circuit according to some embodiments of the present disclosure.

FIG. 12 is a schematic diagram of a pixel circuit according to some embodiments of the present disclosure. In some embodiments, as shown in FIG. 12, the first electrode of the voltage limiting transistor T8 is electrically connected to the second input terminal of the compensation circuit 10. That means the first electrode of the voltage limiting transistor T8 is electrically connected to the first electrode of the second transistor T7, and the compensation voltage Vp is reused as the first voltage V_1. With such arrangement, prior to the light-emitting phase t3, if the potential of the second node N2 is coupled higher, the coupled-higher potential of the second node N2 will be pulled lower by the turn-on voltage limiting transistor T8. In addition, with the arrangement that the first electrode of the voltage limiting transistor T8 receives the compensation voltage Vp having a voltage value greater than the first power supply voltage Vd, it is ensured that the voltage limiting transistor T8 is turned off in the light-emitting phase t3, and the voltage of the second node N2 is limited to the first power supply voltage Vd. In this way, the potential stability of the second node N2 is ensured, the potential stability of the first node N1 is ensured accordingly, and the pixel circuit provides a stable drive current. In addition, the number of the voltage signals required by the pixel circuit is reduced, the wiring number of the signal lines in the display panel including the pixel circuit is reduced, thereby saving the wiring space of the display panel.

Figure 13:
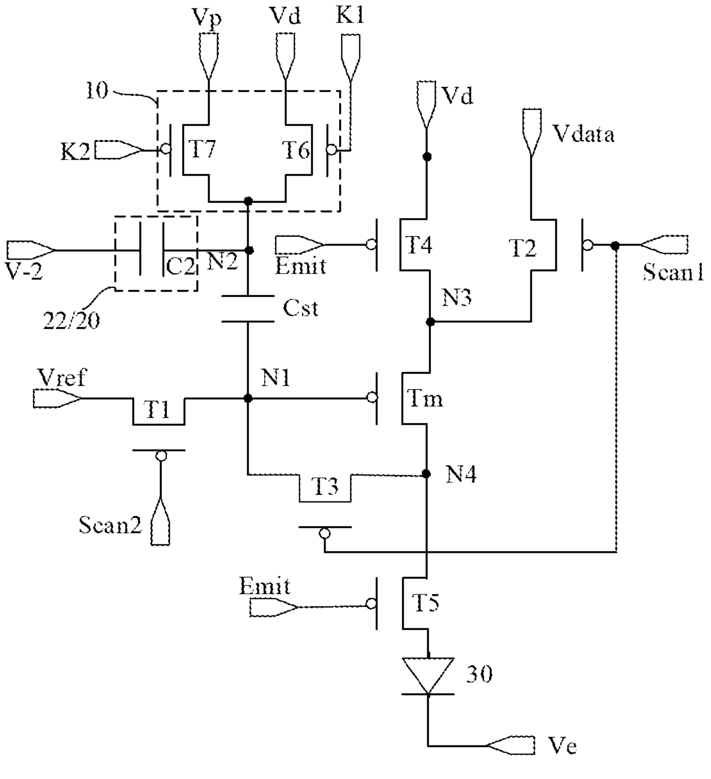
FIG. 13 is a schematic diagram of a pixel circuit according to some embodiments of the present disclosure.

FIG. 13 is a schematic diagram of a pixel circuit according to some embodiments of the present disclosure. In some embodiments, as shown in FIG. 13, the voltage controller 20 includes a voltage stabilizing circuit 22. The voltage stabilizing circuit 22 includes a first terminal connected receiving a second voltage V_2 and a second terminal connected to the second node N2. The voltage stabilizing circuit 22 is configured to maintain a voltage difference between its first and second terminals and adjust the voltage of the second node N2 when the voltage of the second node N2 fluctuates. In this embodiment, the voltage stabilizing circuit 22 is connected to the second node N2 and can keep the voltage difference between its first and second terminals stable without changing. Therefore, prior to the light-emitting phase t3, when the voltage of the second node N2 fluctuates due to the signal jump of the second control signal K2, the voltage stabilizing circuit 22 can control the voltage fluctuation of the second node N2 and further control the voltage fluctuation of the first node N1, preventing the magnitude of the drive current from being affected by the voltage fluctuation of the first node N1, improving the display uniformity and ensuring the display effect.

As shown in FIG. 13, the voltage stabilizing circuit 22 includes a voltage stabilizing capacitor C2. The voltage stabilizing capacitor C2 includes a first plate receiving a second voltage V-2 and a second plate connected to the second node N2. Since the voltage difference between the first plate and the second plate of the voltage stabilizing capacitor C2 may not change instantly, the voltage difference between the two plates of the voltage stabilizing capacitor C2 remains unchanged after the second transistor T7 is turned on and inputs the compensation voltage Vp to the second node N2. When the voltage of the second node N2 fluctuates due to the signal jump of the second control signal K2, the coupling effect of the voltage stabilizing capacitor C2 can restore the voltage of the second node N2, so the voltage fluctuation of the second node N2 is controlled prior to the light-emitting phase.

Figure 14:
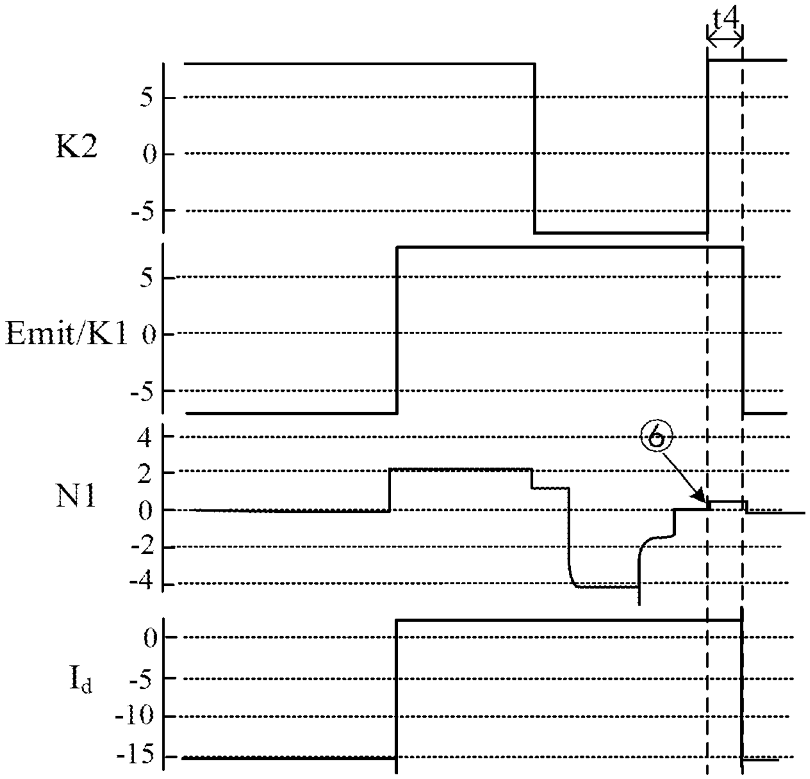
FIG. 14 is a schematic graph showing a simulation result of the operation of the pixel circuit shown in FIG. 13 according to some embodiments of the present disclosure.

The operation process of the pixel circuit in the embodiment of FIG. 13 is simulated to study the voltage change of the first node N1 in the operation process of the pixel circuit. FIG. 14 is a schematic graph showing a simulation result of the operation of the pixel circuit shown in FIG. 13. The first curve in FIG. 14 is the timing diagram of the second control signal K2, where the ordinate is expressed in volts. The second curve in FIG. 14 is the timing diagram of the light-emitting control signal Emit, where the ordinate is expressed in volts. The third curve in FIG. 14 shows the voltage change of the first node N1 in the operation cycle of the pixel circuit, where the ordinate is expressed in volts. The fourth curve in FIG. 14 shows the timing diagram of the drive current Id, where the ordinate is expressed in micro-ampere. As shown in FIG. 14, at the position ⑥, the potential of the first node N1 is pulled higher by the rising edge of the second control signal K2. Compared with FIG. 4, the pulled-higher amount of the potential of the first node N1 in the fourth phase t4 is smaller. This verifies that the coupling effect of the voltage stabilizing capacitor C2 can reduce the pulled-higher amount of the potential of the first node N1 due to the rising edge of the second control signal K2, thereby reducing the change amount of the potential of the first node N1. In addition, in the light-emitting phase t3, the falling edge of the light-emitting control signal Emit pulls the potential of the second node N2 lower. Thanks to the coupling effect of the voltage stabilizing capacitor C2, the pulled-lower amount of the potential of the second node N2 due to the falling edge of the light-emitting control signal Emit is reduced. That is, the coupling effect of the voltage stabilizing capacitor C2 suppresses the feed through of the light-emitting control signal Emit. In view of the above, the voltage stabilizing capacitor C2 not only suppresses the pulling-higher of the potential of the second node N2 caused by the rising edge of the second control signal K2, but also suppresses the pulling-lower of the potential of the second node N2 caused by the falling edge of the light-emitting control signal Emit. Accordingly, the voltage fluctuation of the first node N1 is controlled by the voltage stabilizing capacitor C2, and the magnitude of the drive current is prevented from being affected by the voltage fluctuation of the first node N1, thereby improving the display uniformity and ensuring the display effect.

In some embodiments, the first terminal of the voltage stabilizing circuit 22 is electrically connected to the second input terminal of the compensation circuit 10. That is, the first terminal of the voltage stabilizing circuit 22 is electrically connected to the first electrode of the second transistor T7, and the compensation voltage Vp is reused as the second voltage V_2. In some embodiments of the present disclosure, the voltage value of the compensation voltage Vp is greater than the voltage value of the first power supply voltage Vd. The compensation voltage Vp may be an ideal power supply voltage. Alternatively, the compensation voltage Vp is a power supply voltage supplied by a drive chip and having no voltage drop loss. There is no voltage drop in the signal transmission of the compensation voltage Vp. For example, there is no current in the signal line transmitting the compensation voltage Vp. In applications, such arrangement can ensure that the pixel circuits at different positions of the display panel receive the compensation voltages Vp having the same voltage value. By reusing the compensation voltage Vp as the second voltage V_2, the voltage fluctuation control situations of the second nodes N2 in the pixel circuits are the same.

Another constant voltage signal required by the operation of the pixel circuit may be reused as the second voltage V_2. In some embodiments, the reset signal Vref is reused as the second voltage V_2.

Figure 15:
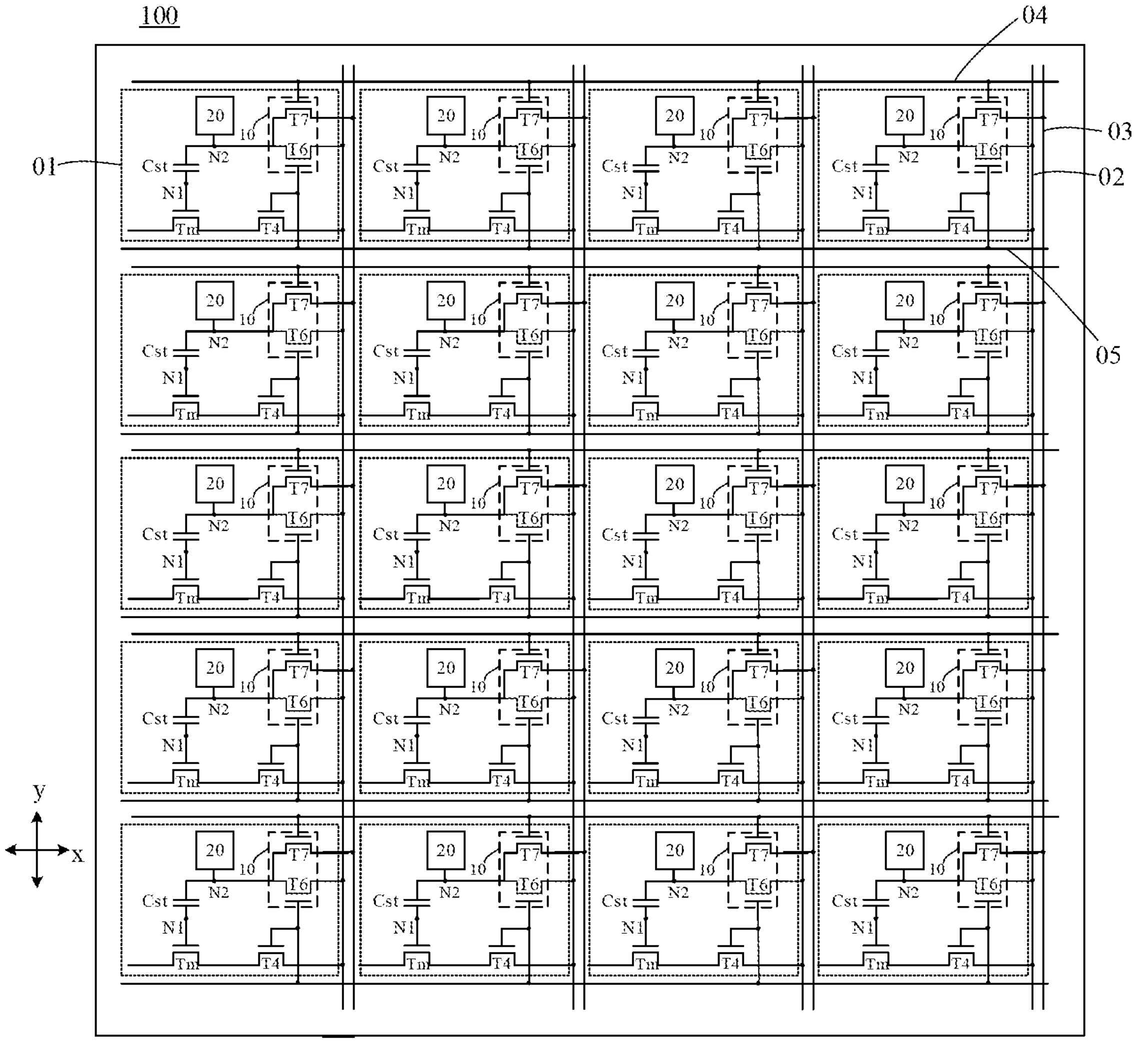
FIG. 15 is a schematic diagram of a display panel according to some embodiments of the present disclosure.

Embodiments of the present disclosure further provide a display panel. FIG. 15 is a schematic diagram of a display panel according to some embodiments of the present disclosure. As shown in FIG. 15, the display panel 100 includes the pixel circuit 01 provided by any embodiment of the present disclosure. The display panel 100 incudes multiple pixel circuits 01. The specific structure of the pixel circuit 01 has been described in the above embodiments of the pixel circuit and is not repeated here. The display panel further includes light-emitting elements connected to the pixel circuits 01. The light-emitting element may be an organic light-emitting diode or an inorganic light-emitting diode.

In FIG. 15, only a simplified illustration of the pixel circuit 01 is shown, and only part of the structure of the pixel circuit 01 is depicted. As shown in FIG. 15, the display panel further includes power supply lines 02 and compensation signal lines 03. The power supply line 02 provides the first power supply voltage Vd, and the compensation signal line 03 provides the compensation voltage Vp. Each pixel circuit 01 includes a first light-emitting control transistor T4. The first light-emitting control transistors T4 of the multiple pixel circuits 01 are connected to the power supply lines 02. The compensation circuit 10 includes a second transistor T7. The second transistors T7 of the multiple pixel circuits 01 are connected to the compensation signal lines 03. Multiple pixel circuits 01 in the display panel 100 are arranged along a first direction x to form pixel circuit rows, and multiple pixel circuits 01 in the display panel 100 are arranged along a second direction y to form pixel circuit columns. The first light-emitting control transistors T4 in the pixel circuits 01 in the same pixel circuit column are connected to one power supply line 02. The second transistors T7 in the pixel circuits 01 in the same pixel circuit row are connected to one compensation signal line 03.

The display panel shown in FIG. 15 further includes second control lines 04 and light-emitting control lines 05. The second control line 04 provides the second control signal K2. The gate electrodes of the pixel circuits 01 are connected to the second control lines 04. The light-emitting control line 05 provides the light-emitting control signal Emit. The light-emitting control signal Emit is reused as the first control signal K1. The gate electrode of the first transistor T1 and 47 the gate electrode of the first light-emitting control transistor T4 are both connected to the light-emitting control line 05.

FIG. 15 shows an example embodiment in which the first electrode of the first transistor T6 in the compensation circuit 10 is electrically connected to the power supply line 02, and the first input terminal of the compensation circuit 10 receives the first power supply voltage Vd. In some embodiments, the first electrode of the first transistor T6 in the compensation circuit 10 is electrically connected to the first light-emitting control transistor T4. When the first light-emitting control transistor T4 is turned on, the first input terminal of the compensation circuit 10 receives the first power supply voltage Vd.

Figure 16:
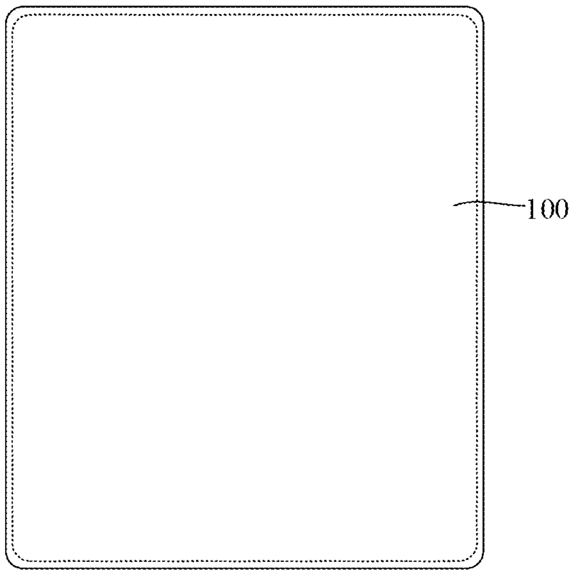
FIG. 16 is a schematic diagram of a display device according to some embodiments of the present disclosure.

Embodiments of the present disclosure further provide a display device. FIG. 16 is a schematic diagram of a display device according to some embodiments of the present disclosure. As shown in FIG. 16, the display device includes the display panel 100 provided by any embodiment of the present disclosure. The display device provided by embodiments of the present disclosure may be an electronic device such as a mobile phone, a tablet, a computer, a TV, a smart wearable and the like. The display device may also be a transparent display device.

The above descriptions are merely preferred embodiments of the present disclosure and are not intended to limit the present disclosure. Any modifications, equivalent replacements, improvements, and the like made within the spirit and principle of the present disclosure shall fall within the protection scope of the present disclosure.

Finally, it should be noted that the foregoing embodiments are merely intended to describe and not to limit the technical solutions of the present disclosure. Although the present disclosure has been described in detail with reference to the foregoing embodiments, persons skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions of the embodiments of the present disclosure.

What is claimed is:

1. A pixel circuit, comprising:

a drive transistor comprising a gate electrode connected to a first node, wherein the drive transistor is configured to generate a drive current in a light-emitting phase of an operation cycle of the pixel circuit;

a storage capacitor comprising a first plate connected to the first node and a second plate connected to a second node, wherein the storage capacitor is configured to store a data voltage inputted to the gate electrode of the drive transistor;

a compensation circuit comprising an output terminal connected to the second node and a first input terminal for receiving a first power supply voltage, wherein the compensation circuit is configured to compensate a deviation of the first power supply voltage affecting the drive current; and a voltage controller connected to the second node and configured to control a fluctuation of a voltage of the second node prior to the light-emitting phase.

2. The pixel circuit according to claim 1, further comprising a data writing transistor and a threshold compensation transistor, wherein the drive transistor further comprises a first electrode connected to a third node and a second electrode connected to a fourth node, wherein the data writing transistor is connected to the third node, and the threshold compensation transistor is connected in series between the fourth node and the first node, the operation cycle of the pixel circuit further comprises a data writing phase, wherein in data writing phase, the data writing transistor and the threshold compensation transistor are turned on so as to input the data voltage to the first node and compensate a threshold voltage of the drive transistor, and the voltage controller is further configured to control the fluctuation of the voltage of the second node subsequent to the data writing phase.

3. The pixel circuit according to claim 1, wherein the compensation circuit further comprises:

the first input terminal for receiving the first power supply voltage;

a second input terminal for receiving a compensation voltage;

a first control terminal for receiving a first control signal; and a second control terminal for receiving a second control signal, wherein the compensation circuit is further configured to input the first power supply voltage to the second node under action of the first control signal and input a compensation voltage to the second node under action of the second control signal, and wherein in the operation cycle of the pixel circuit, an enable duration of the first control signal does not overlap an enable duration of the second control signal.

4. The pixel circuit according to claim 3, wherein the compensation circuit comprises a first transistor and a second transistor, the first transistor comprising a gate electrode for receiving the first control signal, a first electrode for receiving the first power supply voltage, and a second electrode connected to the second node; and the second transistor comprising a gate electrode for receiving the second control signal, a first electrode for receiving the compensation voltage, and a second electrode connected to the second node.

5. The pixel circuit according to claim 3, further comprising a first light-emitting control transistor and a second light-emitting control transistor, wherein the drive transistor is connected in series between the first light-emitting control transistor and the second light-emitting control transistor, and a gate electrode of the first light-emitting control transistor and a gate electrode of the second light-emitting control transistor receive a light-emitting control signal, respectively; and wherein the first control terminal of the compensation circuit receives the light-emitting control signal that is reused as the first control signal.

6. The pixel circuit according to claim 5, wherein a first electrode of the first light-emitting control transistor receives the first power supply voltage, and the compensation circuit comprises a first transistor and a second transistor;

the first transistor comprises a gate electrode of the first transistor for receiving the light-emitting control signal, a first electrode of the first transistor connected to a second electrode of the first light-emitting control transistor, a second electrode of the first transistor connected to the second node; and the second transistor comprises a gate electrode for receiving the second control signal, a first electrode of the second transistor for receiving the compensation voltage, and a second electrode of the second transistor connected to the second node.

7. The pixel circuit according to claim 3, wherein a voltage value V1 of the first power supply voltage received by the first input terminal and a voltage value V2 of the compensation voltage received by the second input terminal satisfy $V2>V1$.

8. The pixel circuit according to claim 7, wherein $V2=V1+\Delta V$, where $\Delta V$ is a voltage drop of the first power supply voltage generated due to transmission of the first power supply voltage on a signal line.

9. The pixel circuit according to claim 3, wherein the voltage controller comprises a voltage limiting circuit, wherein the voltage limiting circuit comprises a first terminal for receiving a first voltage and a second terminal connected to the second node, and the voltage limiting circuit is turned on to lower a potential of the second node when the voltage of the second node is greater than the first voltage.

10. The pixel circuit according to claim 9, wherein the voltage limiting circuit comprises a voltage limiting transistor, and the voltage limiting transistor comprises a first electrode of the voltage limiting transistor for receiving the first voltage, a gate electrode of the voltage limiting transistor connected to the first electrode of the voltage limiting transistor, and a second electrode of the voltage limiting transistor connected to the second node.

11. The pixel circuit according to claim 10, wherein a voltage value of the first voltage is greater than a voltage value of the first power supply voltage received by the first input terminal.

12. The pixel circuit according to claim 10, wherein the first electrode of the voltage limiting transistor is electrically connected to the second input terminal of the compensation circuit, and the compensation voltage is reused as the first voltage.

13. The pixel circuit according to claim 3, wherein the voltage controller comprises a voltage stabilizing circuit, the voltage stabilizing circuit comprises a first terminal for receiving a second voltage and a second terminal connected to the second node; and the voltage stabilizing circuit is configured to maintain a voltage difference between the first terminal and the second terminal of the voltage stabilizing circuit and adjust the voltage of the second node when the voltage of the second node fluctuates.

14. The pixel circuit according to claim 13, wherein the voltage stabilizing circuit comprises a voltage stabilizing capacitor, a first plate of the voltage stabilizing capacitor receives the second voltage, and a second plate of the voltage stabilizing capacitor is connected to the second node.

15. The pixel circuit according to claim 13, wherein the first terminal of the voltage stabilizing circuit is electrically connected to the second input terminal of the compensation circuit, and the compensation voltage is reused as the second voltage.

16. The pixel circuit according to claim 3, wherein in the operation cycle of the pixel circuit, an ending moment of the enable duration of the second control signal is prior to a starting moment of the enable duration of the first control signal.

17. The pixel circuit according to claim 16, further comprising a data writing transistor, wherein a gate electrode of the data writing transistor receives a third control signal, and the operation cycle of the pixel circuit further comprises a data writing phase, in which the data writing transistor is turned on to input the data voltage to the pixel circuit, and in the operation cycle of the pixel circuit, an ending moment of an enable duration of the third control signal is prior to the ending moment of the enable duration of the second control signal.

18. A display panel comprising pixel circuits, wherein at least one of the pixel circuits comprises:

a drive transistor comprising a gate electrode connected to a first node, wherein the drive transistor is configured to generate a drive current in a light-emitting phase of an operation cycle of the pixel circuit;

a storage capacitor comprising a first plate connected to the first node and a second plate connected to a second node, wherein the storage capacitor is configured to store a data voltage inputted to the gate electrode of the drive transistor;

a compensation circuit comprising an output terminal connected to the second node and a first input terminal for receiving a first power supply voltage, wherein the compensation circuit is configured to compensate a deviation of the first power supply voltage affecting the drive current; and a voltage controller connected to the second node and configured to control a fluctuation of a voltage of the second node prior to the light-emitting phase.

19. The display panel according to claim 18, further comprising a power supply line and a compensation signal line, wherein the power supply line provides the first power supply voltage, and the compensation signal line provides a compensation voltage, each pixel circuit further comprises a first light-emitting control transistor, and the first light-emitting control transistors of the pixel circuits are connected to the first power supply voltage, and the compensation circuit of each pixel circuit further comprises a second transistor, and the second transistors of the pixel circuits are connected to the compensation signal line.

20. A display device comprising a display panel, wherein the display panel comprises a pixel circuit, and the pixel circuit comprises:

a drive transistor comprising a gate electrode connected to a first node, wherein the drive transistor is configured to generate a drive current in a light-emitting phase of an operation cycle of the pixel circuit;

a storage capacitor comprising a first plate connected to the first node and a second plate connected to a second node, wherein the storage capacitor is configured to store a data voltage inputted to the gate electrode of the drive transistor;

a compensation circuit comprising an output terminal connected to the second node and a first input terminal for receiving a first power supply voltage, wherein the compensation circuit is configured to compensate a deviation of the first power supply voltage affecting the drive current; and a voltage controller connected to the second node and configured to control a fluctuation of a voltage of the second node prior to the light-emitting phase.

* * * * *